United States Patent [19]

Kishida et al.

[11] Patent Number: 4,478,903

[45] Date of Patent: Oct. 23, 1984

[54] COMPOSITE PLASTICS SHEET HAVING CONDUCTIVE SURFACE

[75] Inventors: Kozi Kishida, Yokohama; Noboru Iwato, Zama; Yuji Ozeki, Yamato, all of Japan

[73] Assignee: Denki Kagaku Kogyo Kabushiki Kaisha, Tokyo, Japan

[21] Appl. No.: 379,538

[22] Filed: May 18, 1982

[30] Foreign Application Priority Data

Jun. 11, 1981 [JP] Japan .................................. 56-89991

[51] Int. Cl.³ .............................................. B32B 7/02
[52] U.S. Cl. .................................... 428/216; 252/510; 252/518; 428/521; 428/522; 428/35
[58] Field of Search ................. 428/517, 521, 35, 522, 428/492, 493, 244, 323, 519, 216; 252/510, 518

[56] References Cited

U.S. PATENT DOCUMENTS

| | | | |
|---|---|---|---|
| 4,009,093 | 2/1977 | Luch | 252/510 |
| 4,051,298 | 9/1977 | Misiura et al. | 428/517 |
| 4,101,050 | 7/1978 | Buckler et al. | 428/517 |

*Primary Examiner*—George F. Lesmes
*Assistant Examiner*—E. Rollins Buffalow
*Attorney, Agent, or Firm*—Jordan and Hamburg

[57] ABSTRACT

A composite plastics sheet made of a polystyrene base resin or an ABS base resin is provided. The composite plastics sheet has a conductive covering layer laminated by co-extrusion on the face of the substrate sheet. The material for the conductive covering layer is made of a polystyrene base resin or an ABS base resin and mixed with a conductive carbon black material, such as furnace black or channel black, in an amount such that the flow index at the extrusion step thereof at 200° C. and under a loading of 5 kg is not lower than 0.1 g/10 min and such that the surface specific resistance of the resultant mixture is not more than $10^{10}$ ohms.

15 Claims, No Drawings

COMPOSITE PLASTICS SHEET HAVING CONDUCTIVE SURFACE

BACKGROUND OF THE INVENTION

1. Field of the Invention

The present invention relates to a composite plastics sheet having a specific surface resistance of not more than $10^{10}$ ohms and being used as a package material for packing integrated circuitry products. More particularly, the invention relates to a composite plastics sheet comprising a substrate sheet made of polystyrene or ABS base resin having a face covered by a similar resin layer admixed with carbon black particles to have a surface conductivity and being laminated on the substrate sheet by co-extrusion.

2. Prior Art

Polystyrene and ABS base resins are widely used as the materials for molded articles and also as the materials for wrapping sheets. However, the sheets made of polystyrene or ABS resin base plastics materials are apt to be charged with electricity, since they have high specific surface resistances. As a result, when a sheet material made of a polystyrene or ABS base resin is used for packing or wrapping an integrated circuitry (hereinafter referred to as IC) product, there is a risk that the performance characteristics of the IC product are damaged. In order to obviate such a troublesome result, many proposals have been made including, for example, (1) a method of coating an antistatic agent on the surfaces of a package container, (2) a method of coating a conductive paint on the surfaces of a package container, and (3) a method of compounding an antistatic agent or a conductive material, such as carbon black, in the matrix resin.

However, the product prepared by the method (1) set forth hereinabove is not durable for prolonged use, because the covering antistatic agent layer tends to be removed by abrasion or washed away by water. Moreover, the specific surface resistance of the product coated with an antistatic agent is in the order of $10^9$ to $10^{12}$ ohms, and the product as such is not suited for use as a package material for wrapping some sorts of IC products, such as LSI (large scale integrated circuitry) products.

The method set forth in (2) above is inconvenient in that the resinous materials which may be used as the vehicles of the paint to be intimately bound to the substrate sheet are strictly limited. Another disadvantage of the product prepared by this known method is that it is difficult to form an even coating of conductive paint. Furthermore, the conductive paint layer is susceptible to rubbing to be peeled off, leading to not only being deprived of the antistatic property but also the damage of the IC products wrapped by the package material coated by the conductive paint layer.

If an antistatic agent is used in the method set forth in (3) above, difficulty is encountered in molding step in case where the added amount thereof is large, whereas the specific surface resistance is lowered in case where the added amount thereof is small. Practically, it is impossible to prepare a sheet having satisfactory static charge preventing property, because the specific surface resistance of the product cannot be lowered less than $10^{11}$ ohms even by the utmost skill. In case where a conductive material, such as carbon black and metal powders, is used as the compounded conductive material, a large amount of carbon black or metal powders must be admixed and compounded with the matrix resinous material to result in deterioration of fluidity at the continuous extrusion molding step to make it difficult to obtain a sheet having satisfactory properties, nevertheless the persistency or durability of the static charge preventing effect and the effect of increasing the specific surface resistance may be greatly improved. In addition, the mechanical strengths, particularly the impact strength, of the resultant sheet material are extremely reduced to an extent unsatisfactory for practical uses due to inferior compounding property. It has been proposed to add a large amount of a variety of liquid paraffin or other mineral oils or a variety of lubricants, or to use a low molecular weight resin, in order to improve the fluidity at the extrusion molding step. However, the sheets obtained by these known methods are unsatisfactory for use as the materials for the IC package containers, for the reason that the mechanical strengths, particularly the rigidity and impact strength thereof are seriously deteriorated.

Further requirements for general sheet materials molded by vacuum or pressure molding processes are that the materials be properly processed through the sheet-forming and trimming steps without any malformation, that the sheet is not fissured during the vacuum and pressure thermo-forming step for molding a container and that any damages, such as formation of cracks, are not caused at the trimming step for finishing the container. In other words, the sheet materials must have the mechanical strengths, particularly the bending and impact strengths, of higher than certain levels.

OBJECTS AND SUMMARY OF THE INVENTION

A primary object of this invention is to provide a composite plastics sheet having a conductive surface, the conductivity of which is persistent for a long period of time.

Another object of this invention is to provide a composite plastics sheet having a conductive surface which resists to rubbing or abrasion.

A further object of this invention is to provide a composite plastics sheet of the aforementioned type in which the conductive surface layer is laminated over the substrate sheet material by co-extrusion molding to be intimately united together.

A still further object of this invention is to provide a composite plastics sheet having excellent mechanical strengths, particularly excellent in rigidity or integrity and bending and impact strengths, and improved machinability at the subsequent molding steps for forming containers of various shape and dimensions.

A final and most important object of this invention is to provide a composite plastics sheet suited for use for wrapping goods which are apt to be damaged by static charge accumulated on the surface of the wrapping material.

The composite plastics sheet having a conductive surface according to this invention comprises a substrate sheet made of a resin selected from the group consisting of a polystyrene base resin and an ABS base resin and a conductive surface layer made of a resin selected from the group consisting of a polystyrene resin and an ABS base resin, said conductive surface layer containing 5 to 50%, by weight, of carbon black and having a specific surface resistance of not more than $10^{10}$ ohms, said conductive surface layer being laminated on one or both faces of said substrate sheet by co-extrusion.

DETAILED DESCRIPTION OF THE INVENTION

The resinous material used for the substrate sheet and as the matrix resin for the conductive surface layer includes polystyrene base resins and the so-called ABS base resins.

More specifically, the polystyrene base resin defined in the specification and claims includes a homopolymer of styrene, high impact strength polystyrenes and mixtures thereof. The high impact strength polystyrenes include a graft polymer in which styrene is graft polymerized with rubber-like polymers of dienes such as homopolymers of conjugated diene monomers, e.g. butadiene, isoprene, dimethylbutadiene, cyclopentadiene, chloroprene and cyanoprene. The mixtures of homopolymer of styrene and the high impact strength polystyrenes may also be used. Further, the polystyrene base resin include the homopolymer of styrene and/or the high impact strength polystyrenes blended with various kinds of known resins. Such resins include copolymers of styrene such as styrene-butadiene block copolymer, styrene-butadiene random copolymer or styrene-isoprene block copolymer; rubber-like polymers of dienes such as polymers of butadiene, isoprene, dimethylbutadiene, cyclopentadiene, chloroprene or cyanoprene; polymers of olefins such as polyethylene, polypropylene or polybutene; and copolymers of olefins such as ethylene-propylene copolymer, ethylene-butene copolymer or propylene-butene copolymer.

The ABS base resin defined in the specification and claims is a graft copolymer containing a rubber-like polymer of dienes, an aromatic vinyl compound and an acrylic monomer. As the rubber-like polymer of dienes there may be mentioned homopolymers of conjugated diene monomers such as butadiene, isoprene, dimethylbutadiene, cyclopentadiene, chloroprene or cyanoprene and copolymers of the conjugated diene monomers with a monomer copolymerizable with the conjugated diene monomers such as styrene, acrylonitrile, methylmethacrylate, ethylacrylate, isobutylene or 1-butene. The examples of the aromatic vinyl compound to be graft copolymerized are styrene, α-methylstyrene, vinyltoluene, chlorostyrene, and tert-butylstyrene. The examples of the acrylic monomer to be graft copolymerized are acrylonitrile, methacrylonitrile, methylacrylate, methylmethacrylate, ethylacrylate and butylacrylate. The ABS base resin includes the above mentioned polymers blended with an acrylonitrile-styrene copolymer.

The material resin for the substrate sheet may be mixed with an additional material to bring the fluidity at the co-extrusion molding step thereof closer to the fluidity of the material for the conductive surface layer or to improve the properties of the finished product sheet. The additional material includes liquid paraffin, mineral oils, lubricants and mixtures thereof. A suitable amount of coloring agent may be added to the material resin for the substrate sheet. It is preferred that scraps of the material for the conductive surface layer or a small amount of carbon black may be added to the material for the substrate sheet in order to bring the fluidity, more specifically the flow index thereof closer to that of the material for the conductive surface layer within the limit not to deteriorate the mechanical properties and strengths of the finished product.

The resinous material for the conductive surface layer contains carbon black in an amount so that the compounded mixture has a specific surface resistance of not more than $10^{10}$ ohms and the flow index at 200° C. under a loading of 5 kg (the flow index being determined generally in accordance with the JIS-K-6870 Method) of the compounded mixture is not less than 0.1 g/10 min.

The impact strength, bending strength, rigidity and other physical properties of the composite sheet according to this invention are shared by the substrate sheet, and thus such properties of the conductive surface layer need not be taken care of so much. The more important characteristics required and critical are sufficient improvement in fluidity at the co-extrusion molding step and improvement in intimate adherent property with the substrate sheet material.

In order to satisfy this critical requirement, an appropriate amount of any of the known additives, such as liquid paraffin, mineral oils or lubricants, may be mixed with the material for the conductive surface layer.

Commercially available grades of carbon black may be used in the compounded material for the conductive surface layer. The representative examples are furnace black and channel black. More specific examples of preferred carbon black are those having large specific surface areas and providing higher conductivity even when a small quantity of the carbon black is added to the matrix resin, the examples being S.C.F. (Super Conductive Furnace), E.C.F. (Electric Conductive Furnace), Ketjen Black EC (Trade Name of the product available from Lion-AKZO Co., Ltd.) and acetylene black. The amount of the added carbon black ranges between 5 and 50 wt %, preferably between 10 and 40 wt %. If the content of carbon black is less than 5 wt %, the specific surface resistance of the conductive surface layer becomes too higher to be used as a material for wrapping IC products; whereas if the content of carbon black exceeds 50 wt %, the uniform dispersibility and the moldability at the co-extrusion step are adversely affected, resulting in deterioration of the physical properties including the aforementioned mechanical strengths.

The process for the production of the composite plastics sheet will now be described. Firstly, a compounded material for the conductive surface layer is prepared by kneading or compounding a matrix resin, selected from polystyrene base and ABS base resins, with carbon black particles using any of the known kneaders, such as Bunbury's mixer or other type extruders, followed by pelletizing. Then, using twin extruders, one for supplying the material for the substrate sheet and the other for supplying the material for the conductive surface layer, the substrate sheet and the conductive surface layer or layers are extrusion molded through double or triple dies to form an integral laminated sheet. Multiple-layered product having five or more layers including internal conductive layers may be formed using an increased number of dies, and such multiple-layered products are included in this invention.

The molding temperature at the co-extrusion step properly ranges from 170° C. to 300° C. Uniform molding cannot be expected if the molding temperature is lower than 170° C.; whereas if the molding temperature is higher than 300° C., there is a risk that the used resin component is decomposed.

The toal thickness of the composite sheet having a conductive surface and produced through co-extrusion step in accordance with the present invention may range from 0.1 to 3.0 mm, preferably from about 0.2 to 2.0 mm. A package container made from a sheet-form material having a thickness of less than 0.1 mm is too weak to be used for packaging an article therein, whereas a sheet-form material having a thickness of more than 3.0 mm is not readily molded by vacuum and pressure thermo-forming.

The thickness of the conductive surface layer may range between 2% and 70% of the total thickness, preferably between 5% and 50%. It is extremely difficult to prepare a composite sheet having a conductive surface layer the thickness of which is less than 2% of the total thickness of the composite sheet. On the contrary, if the thickness of the conductive surface layer exceeds 70% of the total thickness of the composite sheet, the machinability or moldability at the subsequent container-making step becomes inferior and the physical properties, particularly the mechanical strengths of the final product is appreciably deteriorated or lowered.

EXAMPLES OF THE INVENTION

The present invention will be described more in detail with reference to some examples thereof.

Example 1

As the matrix resin for the conductive surface layer, a high impact strength polystyrene resin available under the Trade Name (Registerd Trade Mark) of "Denka Styrol HI-S-2" produced by Denki Kagaku Kogyo KK was used, and as the carbon black used was the product available under the Registered Trade Mark of "Denka Acetylene Black" produced by Denki Kagaku Kogyo KK. The composition of the material for the conductive surface layer is shown in the following Table. The composition was charged in a Bunbury's mixer heated to 140° C. to be melted and kneaded therein. After the temperature of the kneaded mixture reached 190° C., the mixture was discharged and passed through a mixing roller assembly to form a sheet which was cooled and pulverized to obtain pellets. These pellets were supplied through a supply port of an extruder of 40 m/m$\phi$ (L/D=24) to be melted therein and then to be extruded through a die of a multiple-layer sheet forming die assembly maintained at 200° C.

On the other hand, a high impact strength polystyrene available under the Registered Trade Mark of "Denka Styrol HI-E-4" produced by Denki Kagaku Kogyo KK was supplied through a supply port of an extruder of 65 m/m$\phi$ (L/D=25) to be melted therein and then extruded through another die of the aforementioned multiple-layer sheet forming die assembly. The used die assembly had a plurality of manifolds, each being connected to corresponding extruders, and a plurality of molten resin flows were converged together upstream of the lip. The width of the die assembly was adjusted to 600 mm and the gap formed by the lip was adjusted to 1.0 mm, whereby a composite sheet having a total thickness of 0.5 mm including 0.1 mm thick conductive layer and 0.4 mm thick ordinary polystyrene layer was produced. The layers of the thus produced composite sheet were intimately bound together so that the one of them could not be peeled off from the other. As shown in the following Table, the specific surface resistance and the mechanical strengths of the composite sheet were satisfactory.

A container was formed by vacuum molding using the thus produced composite sheet. The formed container had a sufficiently low specific surface resistance and excellent in rigidity.

Example 2

A composite sheet was produced similarly to Example 1, except in that the produced sheet had a thickness of 0.5 mm and included 0.4 mm thick intermediate layer of ordinary polystyrene resin and conductive surface layers each having a thickness of 0.05 mm and covering the faces of the intermediate layer. As shown in the following Table, the specific surface resistance of each of the conductive surface layers is sufficiently low and the properties including the mechanical strengths are excellent. A container was molded from the thus produced composite sheet by vacuum molding to find that the specific surface resistance thereof was sufficiently low and the rigidity thereof was also satisfactory.

Examples 3 to 5

Similar procedures were repeated as in Example 1, except in that the added amounts of acetylene black compounded with the polystyrene of the conductive layer were changed to the values as shown in the following Table to produce composite sheets each having a thickness of 0.5 mm. As will be apparent from the Table, each sheet having a different specific surface resistance was obtained by varying the added amount of the carbon black, and the properties of the resultant sheet including the mechanical strengths thereof were excellent. Containers were molded from each of the thus produced sheets by vacuum molding process to find that the specific surface resistances of the molded containers were low enough for the aimed use and the rigidity thereof was excellent.

Example 6

A composite sheet having a thickness of 0.5 mm was produced generally in accordance with the procedures as set forth in Example 1, except in that Ketjen Black EC (Trade Name available from Lion-Akzo Co., Ltd.) was used, in the amount as set forth in the Table, in place of the carbon black used in Example 1 to obtain the compounded material for the conductive layer. As will be apparent from the Table, the sheet had a sufficiently low specific surface resistance and was excellent in properties including the mechanical strengths. A container made from the thus produced sheet material by vacuum molding also had a sufficiently low specific surface resistance and was excellent in rigidity.

Example 7

A sheet having a thickness of 0.5 mm was produced in accordance with a procedure similar to Example 1, except in that a polystyrene available under the registered Trade Mark of "Denka ABS GF" and produced by Denki Kagaku Kogyo kk was used in place of the high impact strength polystyrene used as the resinous component of the compounded material for the conductive layer, and except in that an ABS resin available under the registered Trade Mark of "Denka ABS GR-2000" produced by Denki Kagaku Kogyo kk was used in place of the high impact strength polystyrene used as the ordinary resin material for the substrate layer. The thus produced sheet had a sufficiently low specific surface resistance and was excellent in physical properties including the mechanical strengths. A container made from the sheet had also a sufficiently low specific surface resistance and was excellent in rigidity.

Comparative Example 1

A commercially available polystyrene resin produced and sold by Denki Kagaku Kogyo KK under the registered Trade Mark of "Denka Styrol HI-S-2" was used as the high impact polystyrene, and a product produced and sold by Denki Kagaku Kogyo KK under the registered Trade Mark of "Denka Acetylene Black" was used as the carbon black used in the material for the conductive layer. A composition shown in the following Table with the addition of stearic acid was melted and kneaded by a Bunbury's mixer under the conditions similar to Example 1, followed by cooling and pulverization to obtain pellets. The pellets were supplied through a supply port of an extruder having a diameter of 65 mm (L/D=25) to be melted therein and then fed to a one-layer die to be extruded therethrough as a form of a sheet having a thickness of 0.5 mm.

The specific surface resistance and the physical properties are shown in the following Table.

Comparative Example 2

A 0.5 mm thick sheet was produced generally in accordance with the similar procedure as set forth in Comparative Example 1, except in that an ABS resin produced and sold by Denki Kagaku Kogyo KK under the registered Trade Mark of "Denka ABS GF" in place of the high impact strength polystyrene.

The specific surface resistance and the physical properties of the thus produced sheet are shown in the following Table.

Each sample sheet was fixedly secured on a jig having a diameter of 12.7 cm on a Dart Impact Tester constructed generally in accordance with the ASTM-D-1709-'72. A steel ball of 515 g, 1 kg or 2 kg was dropped from the prescribed heights to determine the height at which 50% of the sample were broken down. The impact energy resulting from the 50% breakdown was calculated from the weight and the height of the dropping steel ball.

4. Resistance to Bending (Bending Strength):

The bending strength was determined through a test conducted generally in accordance with the bending strength test prescribed in the JIS-P-8115 Method for conducting the MIT Type Test for Paper and Paper Board. Each test specimen was bent by an angle of 75 degrees at a rate of 175 times per minute under a tension loading of 500 g. The data obtained by testing samples cut off along the flowing direction of the sheet were referred to as Longitudinal, and the data obtained by testing samples cut off along the direction perpendicular to the flowing direction of the sheet were referred to as Transverse in the Table. Each of the longitudinal and transverse data is a mean value calculated in accordance with the JIS-Z-8401 Method (Method of Rounding-off the Data).

It should be appreciated by comparing the data obtained by testing the samples produced in accordance with this invention with those of the samples of Comparative Examples, the composite sheet produced according to this invention are improved remarkably over the products produced by the known technique. Al-

TABLE

|  |  | Example | | | | | | | Com. Ex. | |
|---|---|---|---|---|---|---|---|---|---|---|
|  |  | 1 | 2 | 3 | 4 | 5 | 6 | 7 | 1 | 2 |
| Composition of the conductive Layer (wt. %) | High Impact Strength Polystyrene | 100 | 100 | 100 | 100 | 100 | 100 |  | 100 |  |
|  | ABS |  |  |  |  |  |  | 100 |  | 100 |
|  | Acetylene Black | 30 | 30 | 20 | 25 | 35 |  | 30 | 30 | 30 |
|  | Ketjen Black EC |  |  |  |  |  | 15 |  |  |  |
| Substrate Layer | High Impact Strength Polystyrene | o | o | o | o | o | o |  |  |  |
|  | ABS |  |  |  |  |  |  | o |  |  |
| Properties of the Sheet | Specific Surface Resistance (Ω) | $2 \times 10^4$ | $2 \times 10^4$ | $3 \times 10^6$ | $1 \times 10^5$ | $4 \times 10^2$ | $3 \times 10^4$ | $5 \times 10^4$ | $2 \times 10^4$ | $3 \times 10^4$ |
|  | Tensile Strength (kg/cm$^2$) | 330 | 300 cm) | 320 | 350 | 300 | 320 | 500 | 170 | 270 |
|  | Impact Strength (kg · cm) | 120 | 125 | 127 | 125 | 110 | 105 | 200 | <15 | <15 |
|  | Resistance to Bending   Longitudinal | 380 | 350 | >500 | 450 | 300 | 400 | >500 | 2 | 2 |
|  | Resistance to Bending   Transverse | >500 | >500 | >500 | >500 | 450 | >500 | >500 | 1 | 3 |

The properties of the products produced by Examples and Comparative Examples were determined in accordance with the test methods as set forth below:

1. Specific Surface Resistance

Using Digital Multimeter TR-6853-D (Trade name) produced by Takeda Riken K.K., the specific surface resistances of a sheet of 12 cm square were measured at 20 locations while retaining the distance between both electrodes spaced by 1 cm, and the logarithmic mean value of the data thus determined was calculated.

2. Tensile Strength

Generally in accordance with the JIS-K-6734 Method, each sample was extended using an Instron Tester at an extension rate of 50 mm/min to determine the maximum tension loading until the sample was broken down.

3. Impact Strength (Falling-Ball Impact Test)

though the invention has been described by referring to specific examples, it should be interpreted that the present invention is not limited only to the specific examples as herein disclosed, but it is intended to embrace all modifications and alternatives included in the broad scope of the invention as defined in the appended claims.

What is claimed is:

1. A composite plastics sheet having a conductive surface, comprising a substrate sheet made of a resin selected from the group consisting of a polystyrene base resin and an ABS base resin, and a conductive surface layer made of a resin selected from the group consisting of a polystyrene base resin and an ABS base resin, said conductive surface layer containing 5 to 50%, by weight, of carbon black and having a specific surface resistance of not more than $10^{10}$ ohms, said conductive surface layer being laminated on one or both surfaces of said substrate sheet by co-extrusion, said polystyrene base resin being selected from the group consisting of high impact strength polystyrenes, a blended polystyrene base resin, and mixtures thereof, said polystyrene base resin and said ABS base resin for the conductive surface layer after being compounded with carbon black each having a melt flow index of not less than 0.1 g/10 min. at 200° C. and under the loading of 5 kg, the total thickness of said composite plastics sheet being from 0.1 to 3.0 mm, the thickness of said conductive surface layer ranging from 2% and 70% of said total thickness of the composition plastics sheet.

2. The composite plastics sheet as claimed in claim 1, wherein said high impact strength polystyrene is a graft polymer in which styrene is graft polymerized with rubber-like polymers of dienes.

3. The composite plastics sheet as claimed in claim 2 wherein said diene is a homopolymer of a conjugated diene monomer selected from the group consisting of butadiene, isoprene, dimethylbutadiene, cyclopentadiene, chloroprene and cyanoprene.

4. The composite plastics sheet as claimed in claim 1, wherein the blended polystyrene base resin is a polystyrene base resin blended with a resin selected from the group consisting of copolymers of styrene, rubber-like polymers of dienes, polymers of olefins and copolymers of olefins.

5. The composite plastics sheet as claimed in claim 4, wherein said resin blended with the polystyrene base resin is selected from the group consisting of styrene-butadiene block copolymer, styrene-butadiene random copolymer, styrene-isoprene block copolymer, polybutadiene, polyisoprene, dimethylbutadiene polymer, polymers of cyclopentadiene, polychloroprene, polycyanoprene, polyethylene, polypropylene, polybutene, ethylene-propylene copolymer, ethylene-butene copolymer and propylene-butene copolymer.

6. The composite plastics sheet as claimed in claim 1, wherein the ABS base resin is a graft copolymer containing a rubber-like polymer of dienes, an aromatic vinyl compound and an acrylic monomer.

7. The composite plastics sheet as claimed in claim 6, wherein said rubber-like polymer of dienes is a homopolymer of conjugated diene monomer selected from the group consisting of butadiene, isoprene, dimethylbutadiene, cyclopentadiene, chloroprene and cyanoprene and a copolymer thereof with a coplymerizable monomer selected from the group consisting of styrene, acrylonitrile, methylmethacrylate, ethylacrylate, isobutylene and 1-butene.

8. The composite plastics sheet as claimed in claim 6, wherein the aromatic vinyl compound is selected from the group consisting of styrene, $\alpha$-methylstyrene, vinyltoluene, chlorostyrene and tert-butylstyrene.

9. The composite plastics sheet as claimed in claim 6, wherein said acrylic monomer is selected from the group consisting of acrylonitrile, methacrylonitrile, methylacrylate, methylmethacrylate, ethylacrylate and butylacrylate.

10. The composite plastics sheet as claimed in claim 6, wherein the ABS base resin is an ABS base resin blended with an acrylonitrile-styrene copolymer.

11. The composite plastics sheet as claimed in claim 1, wherein an additive is admixed with said polystyrene base resin and an ABS base resin for the substrate sheet to bring the fluidity thereof closer to that of said polystyrene and said ABS base resin for the conductive surface layer.

12. The composite plastics sheet as claimed in claim 11, wherein said additive is selected from the group consisting of liquid paraffin, mineral oils, lubricants and mixtures thereof.

13. The composite plastics sheet as claimed in claim 1, wherein said polystyrene base resin and said ABS base resin for the conductive surface layer further includes one selected from the group consisting of liquid paraffin, mineral oils, lubricants, and mixtures thereof.

14. The composite plastics sheet as claimed in claim 1, wherein said carbon black is selected from the group consisting of furnace black, channel black, super conductive furnace, and electric conductive furnace.

15. The composite plastics sheet as claimed in claim 1, further comprising an internal conductive layer sandwiched by non-conductive substrate layers.

* * * * *